(12) United States Patent
Hergemöller et al.

(10) Patent No.: US 7,152,393 B2
(45) Date of Patent: Dec. 26, 2006

(54) ARRANGEMENT FOR UTILIZING THE THROTTLE ENERGY OF AN INTERNAL COMBUSTION ENGINE

(75) Inventors: Thorsten Hergemöller, Fellbach (DE); Armin Hürland, Friedrichshafen (DE); Andreas Juretzka, West Bloomfield (DE); Hans-Georg Lehmann, Esslingen (DE)

(73) Assignee: DaimlerChrysler AG., Stuttgart (DE)

( * ) Notice: Subject to any disclaimer, the term of this patent is extended or adjusted under 35 U.S.C. 154(b) by 49 days.

(21) Appl. No.: 11/035,764

(22) Filed: Jan. 14, 2005

(65) Prior Publication Data

US 2005/0150210 A1    Jul. 14, 2005

(51) Int. Cl.
F01N 5/04    (2006.01)

(52) U.S. Cl. .............. 60/280; 60/278; 60/289; 60/290; 60/307; 60/605.2; 60/611; 123/568.11

(58) Field of Classification Search .......... 60/278, 60/280, 284, 289, 290, 293, 307, 324, 605.1, 60/605.2, 608, 611; 123/568.11, 568.15
See application file for complete search history.

(56) References Cited

U.S. PATENT DOCUMENTS

| | | | | |
|---|---|---|---|---|
| 5,458,855 | A * | 10/1995 | Gillbrand | 422/168 |
| 5,974,792 | A * | 11/1999 | Isobe | 60/278 |
| 6,094,909 | A * | 8/2000 | Weber et al. | 60/280 |
| 6,226,986 | B1 | 5/2001 | Driver et al. | |
| 6,334,436 | B1 * | 1/2002 | Paffrath et al. | 123/563 |
| 6,470,682 | B1 * | 10/2002 | Gray, Jr. | 60/605.2 |
| 6,604,362 | B1 * | 8/2003 | Moeckel | 60/614 |
| 6,817,173 | B1 * | 11/2004 | Paffrath et al. | 60/293 |
| 6,883,323 | B1 * | 4/2005 | Hummel | 60/606 |
| 2006/0096279 | A1 * | 5/2006 | Freisinger et al. | 60/289 |

FOREIGN PATENT DOCUMENTS

| | | |
|---|---|---|
| DE | 837 192 | 4/1952 |
| DE | 31 42 668 | 5/1983 |
| DE | 31 48 161 | 6/1983 |
| DE | 32 05 722 | 8/1983 |
| DE | 42 09 684 | 9/1993 |
| DE | 44 45 490 | 6/1996 |
| DE | 198 40 629 | 3/2000 |
| DE | 199 37 781 | 2/2001 |
| DE | 100 05 888 | 8/2001 |
| DE | 100 64 481 | 7/2002 |
| EP | 692 04 839 | 4/1994 |
| JP | 54 148927 | 11/1979 |

\* cited by examiner

*Primary Examiner*—Tu M. Nguyen
(74) *Attorney, Agent, or Firm*—Klaus J. Bach

(57) ABSTRACT

In an arrangement for reducing exhaust emissions and utilizing the throttling energy of an internal combustion engine, a compressor and a generator are operatively connected to a turbine by which the intake air flow is controlled while transferring the throttling energy recuperated by the turbine to the compressor and the generator and, in the engine start-up phase, the compressor supplies fresh air to an engine air intake duct, the intake air flow volume being controlled by the energy withdrawn from the turbine via the compressor and the generator thus eliminating the need for a throttle valve in the fresh air intake line.

6 Claims, 1 Drawing Sheet

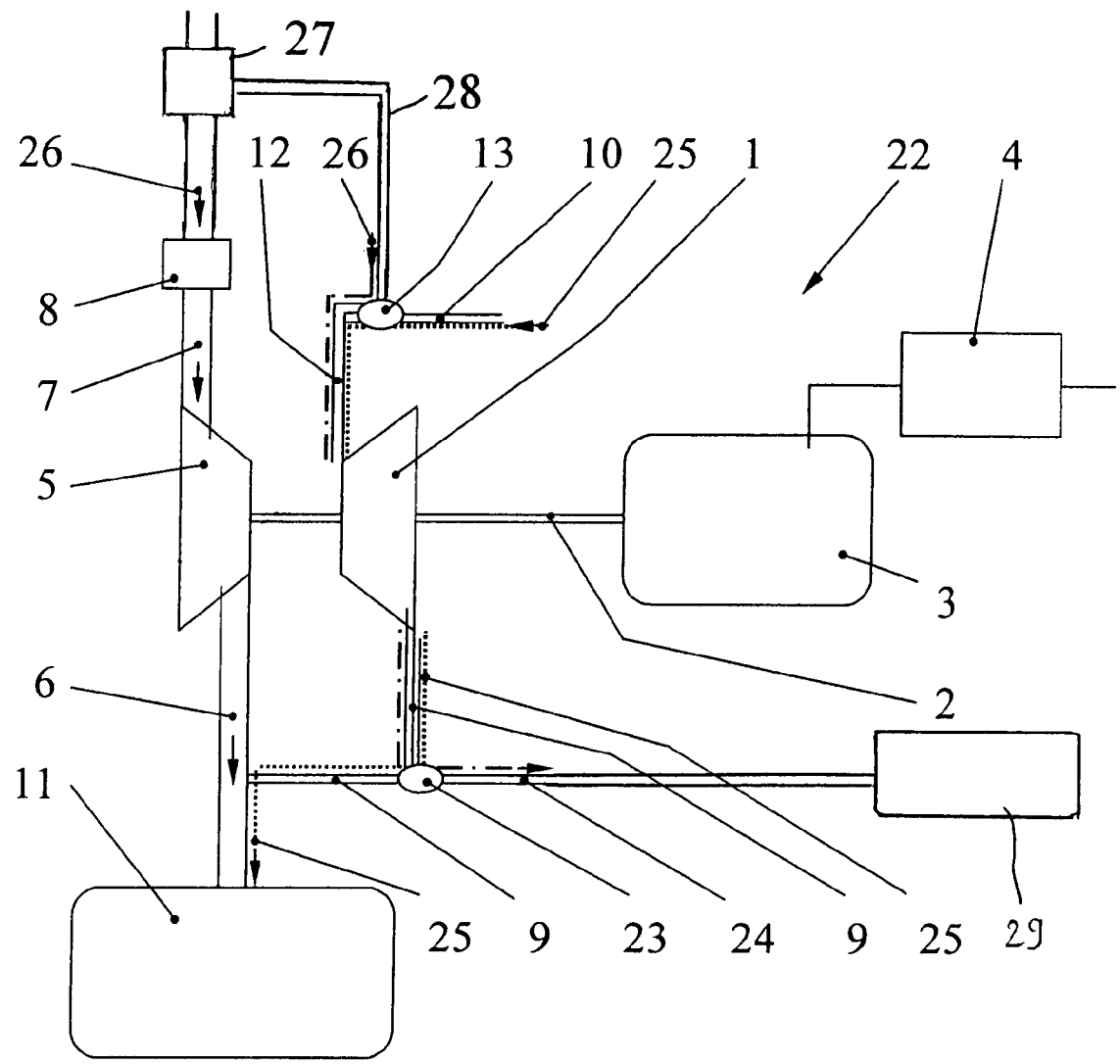

ARRANGEMENT FOR UTILIZING THE THROTTLE ENERGY OF AN INTERNAL COMBUSTION ENGINE

BACKGROUND OF THE INVENTION

The invention relates to an arrangement for reducing the exhaust gas emissions of an internal combustion engine, wherein the throttle energy of the engine including a generator operatively connected to a compressor and a turbine also connected to the compressor for supplying, via a supply line, fresh or to an intake duct of the internal combustion engine while, via the compressor, exhaust gas can also be supplied to the intake duct of the internal combustion engine or, during startup, fresh air can be supplied from an air filter to the exhaust gas duct.

DE 198 40 629 A1 discloses a drive unit for a vehicle with an internal combustion engine for providing propulsion energy wherein the internal combustion engine includes a turbine with a compressor. The turbine is driven by the exhaust gases of the internal combustion engine and the compressor is driven by the turbine. The unit furthermore includes an air duct system for supplying fresh air to the compressor in which the fresh air is compressed to form charge air and the charge air is conducted from the compressor to the internal combustion engine. In addition, an auxiliary compressor is provided which generates compressed fresh air which can be supplied to the air duct system upstream of the internal combustion engine when needed, wherein as auxiliary compressor a compressor already existing in the vehicle for other purposes is used.

It is further known to throttle the combustion air during a cold start and during idling in the intake duct as necessary. To this end, a throttle flap valve is used in a well-known manner. The energy dissipated by the throttle valve is converted to heat which represents pure losses.

It is the object of the present invention to provide an arrangement whereby the throttle energy can be utilized for other processes and converted to other forms of energy while reducing exhaust emissions.

SUMMARY OF THE INVENTION

In an arrangement for reducing exhaust emissions and utilizing the throttling energy of an internal combustion engine, a compressor and a generator are operatively connected to a turbine by which the intake air flow is controlled while transferring the throttling energy recuperated by the turbine to the compressor and the generator and, in the engine start-up phase, the compressor supplies fresh air to an engine air intake duct, the intake air flow volume being controlled by the energy withdrawn from the turbine via the compressor and the generator thus eliminating the need for a throttle valve in the fresh air intake line.

Since the first supply line for the intake air is directly conducted through the turbine, the throttle energy can be utilized in an expedient way, wherein, because of the drive connection between the turbine and the generator, the generator acts as a brake. Therefore, by coupling the turbine to the generator energy is generated. In this way, the energy may be utilized for driving other units for example an electrical servopump or other electrical consumers or for charging the battery. With a corresponding load setting of the generator, the air mass flow can be limited like with a throttle valve. The signal of the throttle valve control is then used for the control of the generator. This does not require any more expenses for the engine control unit. Furthermore, with this arrangement, a secondary air flow can be generated by an auxiliary compressor. The compressor is driven by the turbine and supplies in this way in an advantageous manner secondary air to the exhaust duct by an appropriate valve control.

In this connection, it is advantageous if the auxiliary compressor is driven by the air mass flow from the supply line and consequently by way of the turbines.

It is furthermore advantageous if a flow direction valve is arranged ahead of an opening of a supply line to the compressor such that selectively fresh air from the air filter or residual exhaust gas can be supplied to the compressor.

In another embodiment of the invention, during the startup phase, fresh air is supplied from the air filter via a supply line directly to the compressor and then, via another supply line and a second valve, to the exhaust duct of the internal combustion engine or, thereafter, exhaust gas or, respectively, residual gas is supplied via the second valve to the intake duct.

It is also advantageous if downstream of an outlet opening of the compressor to the other supply line, the additional valve is provided by way of which the secondary air is conducted to the exhaust duct of the internal combustion engine and discharged to the ambient air and the generator is effectively connected to a control unit and/or a power output control unit of the internal combustion engine.

Preferably the compressor and the generator are driven by the turbine under the control of the engine control unit.

With the advantageous embodiment of the arrangement according to the invention, the suction pressure required for the operation of the charger and consequently the necessary intake air mass flow is ensured by the internal combustion engine during start up, idling and in power phase. The utilization of the throttling energy for driving a turbine in the intake duct is achieved by the coupling of the compressor with the generator. With this arrangement, electrical energy can be generated by driving the generator. Furthermore, the required air mass flow is generated by the compressor. For the introduction of secondary air, a secondary air pump is therefore not necessary. With the advantageous valve control and the conduction of air out of the air filter by way of the charger and the bypass line, only little suction resistance is encountered. The air mass flow can further be utilized, with a corresponding valve setting, for cooling the exhaust gas manifold. By a corresponding valve setting, the air mass flow can be directed through the compressor. A catalytic converter may be used thereby advantageously increasing the exhaust gas conversion. Furthermore, with this arrangement and a corresponding valve position, the compressor can be used to suck in the exhaust gas and supply it to the intake duct.

The invention will become more readily apparent from the following description of a particular embodiment thereof on the basis of the accompanying drawings.

BRIEF DESCRIPTION OF THE DRAWINGS

The sole FIGURE shows an arrangement according to the invention for reducing exhaust gas emissions while avoiding engine power losses by throttling.

DESCRIPTION OF A PARTICULAR EMBODIMENT

The FIGURE shows an operating arrangement 22 for an internal combustion engine such as a gasoline engine of which only the intake duct 11 is shown. The operating arrangement 22 comprises a generator 3, which is connected via a drive shaft 2 to a compressor 1. The compressor 1 is operatively connected by way of the drive shaft 2 to a charger or, respectively, a turbine 5.

By way of an exhaust gas line 10 exhaust gas 25 is supplied to the intake duct 11 via a first acting valve 13, a first supply line 12, the compressor 1 and a second supply line 9 when an acting valve 23 is set accordingly. The first acting valve 13 is arranged in the exhaust line 10 between the inlet to the compressor 1 and an air filter 27 for cleaning the intake air. The second acting valve 23 is arranged in the second supply line 9 between the compressor 1 and the intake duct 11. With another setting of the first acting valve 13, air 26 from the air filter 27 can flow via the fresh air line 28, the first supply line 12, the compressor 1, the second supply line 9 and the second acting valve 23 and a line 24 to the exhaust gas manifold 29 of the engine.

As further shown in the FIGURE, air 26 may be conducted via a hot film air mass flow meter 8 (HFM) and a main air supply line 7 directly to the charger or respectively, turbine 5 and, by way of an inlet line 6, to the intake duct 11 of the internal combustion engine. With the advantageous arrangement described herein, the throttle valve normally used in the intake duct is omitted.

The internal combustion engine or, respectively, gasoline engine is quantity-controlled, that is, a sufficient amount of air is provided for the engine via the supply line 6 to maintain its operating state. The conventional throttle valve by which the air flow volume is controlled is not needed. Its function is taken on by the turbine or respectively, charger 5 which can be braked down by the generator for restricting air admission to the engine. The turbine 5 transfers the throttling energy to the generator 3.

The method can be used during start-up of the internal combustion engine, wherein the turbine 5 is used as a secondary air charger. With this procedure, it is advantageous that the hydrocarbon emissions are not increased. In addition, with this procedure, air supply and exhaust gas temperature cooling and as a result the overall engine operating efficiency are improved. There is furthermore no need for additional drive energy. Also the weight of the whole arrangement is relatively low and air mass flow control is optimized. As already mentioned, the intake air duct throttle valve arranged normally between the hot air film mass flow meter 8 and the intake duct can be omitted and the throttling energy can be utilized, that is it can be transferred to the generator 3. For optimizing the method, the generator 3 can be provided with a control unit or, respectively, connected to the engine control unit 4.

What is claimed is:

1. An arrangement for reducing exhaust gas emissions and utilizing the intake air throttling energy of an internal combustion engine having an intake duct (11), a first air supply line (7) for supplying fresh air (26) from an air filter (27) to the intake duct (11), a turbine (5) arranged in the first air supply line (7), a compressor (1) operatively connected to the turbine (5) for rotation therewith by a shaft (2), a generator (3) also connected to the shaft (2) for rotation with the compressor (1) and the turbine (5), an exhaust gas line (10) connected to the compressor (1) for admitting exhaust gas to the compressor (1), the exhaust gas line (10) including a valve (13) connected to a second fresh air supply line (28) extending to the air filter (27) for supplying fresh air to the exhaust gas line (10, 12) and, via the compressor (1) to the intake duct (11) together with recirculated exhaust gas, said first fresh air supply line (7) being so connected to the turbine (5) that, during engine start up or before a first fuel injection cycle of the internal combustion engine, the fresh air supply to the intake duct (11) is quantity-controlled by the turbine (5) whose air flow restriction is controlled by the compressor (1) and the generator (3) which are both operatively connected to the turbine (5) from which, during throttling operation of the engine, energy is withdrawn in a controlled manner by the compressor (1) and the generator (3) for controlling the induction air supply to the intake duct (11) of the internal combustion engine, the second fresh air supply line (28) supplying fresh air to the compressor (1) including an actuating valve (13) for selectively connecting the supply line (12) to at least one of the fresh air line (28) for admitting fresh air (26) to the compressor and the exhaust gas line (10) for supplying exhaust gas to the compressor (1).

2. An arrangement according to claim 1, wherein the compressor (1), which is connected to the turbine (5) is driven by the air mass flow through the air supply line (7) supplying intake air (26) to the intake duct 11 through the turbine (5).

3. An arrangement according to claim 1, wherein the generator (3) is connected to a control unit (4) of the internal combustion engine.

4. An arrangement according to claim 1, wherein the compressor (6) and the generator (3) are operated by the turbine (5) under the control of the control unit (4).

5. An arrangement according to claim 1, wherein, during engine startup, the air filter (27) is placed by the first acting valve (13) via the second fresh air supply line (28) directly in communication with the compressor (1), which, by way of a second supply line (9) and a second acting valve (23), can be placed selectively in communication with the intake duct 11 and an exhaust line (24).

6. An arrangement according to claim 5, wherein the second acting valve (23) arranged in the second supply line (9) downstream of the compressor (1) as adapted to conduct secondary air via the exhaust line (24) to an engine exhaust duct (29).

* * * * *